United States Patent [19]

Dunki-Jacobs et al.

[11] Patent Number: 5,349,525
[45] Date of Patent: Sep. 20, 1994

[54] COLOR FLOW IMAGING SYSTEM UTILIZING A FREQUENCY DOMAIN WALL FILTER

[75] Inventors: Robert J. Dunki-Jacobs, Ballston Lake, N.Y.; Anne L. Hall, New Berlin, Wis.; Richard B. Bernardi, Strafford, Pa.; Matthew O'Donnell, Ann Arbor, Mich.; Lewis J. Thomas, Schenectady, N.Y.; Kenneth B. Welles, II; William E. Engeler, both of Scotia, N.Y.

[73] Assignee: General Electric Company, Schenectady, N.Y.

[21] Appl. No.: 2,000

[22] Filed: Jan. 8, 1993

[51] Int. Cl.$^5$ .......................... C06F 15/42; A61B 8/00
[52] U.S. Cl. .......................... 364/413.25; 128/660.01
[58] Field of Search .......................... 364/413.25, 413.01; 367/135; 128/660.01, 660.102, 660.07

[56] References Cited

U.S. PATENT DOCUMENTS

| | | | |
|---|---|---|---|
| 4,835,689 | 5/1989 | O'Donnell | 364/413.25 |
| 4,839,652 | 6/1989 | O'Donnell et al. | 341/122 |
| 4,896,287 | 1/1990 | O'Donnell et al. | 364/754 |
| 4,983,970 | 1/1991 | O'Donnell et al. | 341/122 |
| 5,014,712 | 5/1991 | O'Donnell | 128/661.01 |
| 5,086,775 | 2/1992 | Parket et al. | 128/660.01 |
| 5,226,420 | 7/1993 | Peterson | 128/661.09 |
| 5,228,009 | 7/1993 | Forestieri et al. | 367/135 |

OTHER PUBLICATIONS

C. Kasai et al., "Real-Time Two-Dimensional Blood Flow Imaging Using an Autocorrelation Technique", IEEE Transactions on Sonics and Ultrasonics, vol. SU-32, No. 3, May 1985, pp. 458-463.

S. Leavitt et al., "A Scan Conversion Allgorithm for Displaying Ultrasound Images", Hewlett-Packard Journal, Oct. 1983, pp. 30-33.

*Primary Examiner*—Gail O. Hayes
*Attorney, Agent, or Firm*—Marvin Snyder

[57] ABSTRACT

An ultrasonic imaging system for displaying color flow images includes a receiver which demodulates ultrasonic echo signals received by a transducer array and dynamically focuses the baseband echo signals. A color flow processor includes a frequency domain adaptive wall filter which automatically adjusts to changes in Doppler-shifted frequency and bandwidth of the wall signal components in the focused baseband echo signals after the echo signals have undergone Fourier transformation into the frequency domain. The mean Doppler-shifted frequency of the resulting filtered baseband echo signals is used to indicate velocity of moving scatterers and to control color in the displayed image.

13 Claims, 8 Drawing Sheets

COLOR FLOW IMAGING SYSTEM UTILIZING A FREQUENCY DOMAIN WALL FILTER

CROSS-REFERENCE TO RELATED APPLICATION

This application is related to commonly assigned Daft et al. application Ser. No. 08/001,998 still pending filed Jan. 8, 1992.

BACKGROUND OF THE INVENTION

This invention relates to acoustical imaging and, in particular, to production of color flow images from ultrasonic Doppler signals.

There are a number of modes in which vibratory energy, such as ultrasound, can be used to produce images of objects. The ultrasound transmitter may be placed on one side of the object and the sound transmitted through the object to the ultrasound receiver placed on the other side ("transmission mode"). With transmission mode methods, an image may be produced in which the brightness of each pixel is a function of the amplitude of the ultrasound that reaches the receiver ("attenuation" mode), or the brightness of each pixel is a function of the fine required for the sound to reach the receiver ("time-of-flight" or "speed of sound" mode). In the alternative, the receiver may be positioned on the same side of the object as the transmitter and an image may be produced in which the brightness of each pixel is a function of the amplitude or time-of-flight of the ultrasound reflected from the object back the receiver ("reflection" "backscatter" or "echo" mode). The present invention relates to a backscatter method for producing ultrasound images.

There are a number of well known backscatter methods for acquiring ultrasound data. In the so-called "A-scan" method, an ultrasound pulse is directed into the object by the transducer and the amplitude of the reflected sound is recorded over a period of time. The amplitude of the echo signal is proportional to the scattering strength of the scattering objects in the subject and the time delay is proportional to the range of the scatterers from the transducer. In the so-called "B-scan" method, transducer transmits a series of ultrasonic pulses as it is scanned across the object along a single axis of motion. The resulting echo signals are recorded as with the A-scan method and their amplitude is used to modulate the brightness of pixels on a display at the time delay. With the B-scan method, enough data =re acquired from which an image of the scanned field of view can be reconstructed.

In the so-called C-scan method, the transducer is scanned across a plane above the object and only the echoes reflecting from the focal depth of transducer are recorded. The sweep of the electron beam of a CRT display is synchronized to the scanning of the transducer so that the x and y coordinates of the transducer correspond to the x and y coordinates of the image.

Ultrasonic transducers for medical application are constructed from one or more piezoelectric elements sandwiched between a pair of electrodes. Such piezoelectric elements are typically constructed of lead zirconate titanate (PZT), poiyvinylidene difluoride (PVDF), or PZT ceramic/polymer composite. The electrodes are connected to a voltage source, when a voltage waveform is applied, the piezoelectric elements change in size at a frequency corresponding to that of the applied voltage. When a voltage waveform is applied, the piezoelectric element emits an ultrasonic wave into the media to which it is coupled. Conversely, when an ultrasonic wave strikes the piezoelectric element, the element produces a corresponding voltage across its electrodes. Typically, the front of the element is covered with an acoustic matching layer that improves the coupling with the media in which the ultrasonic waves propagate. In addition, a backing material is coupled to the rear of the piezoelectric element to absorb ultrasonic waves that emerge from the back side of the element so that they do not interfere. A number of such ultrasonic transducer constructions are disclosed in U.S. Pat. Nos. 4,217,684; 4,425,525; 4,441,503; 4,470,305 and 4,569,231, all of which are aligned to the instant assignee.

When used for ultrasound imaging, the transducer typically has a number of piezoelectric elements arranged in an array and driven with separate voltages (apodizing). By controlling the time delay (or phase) and amplitude of the applied voltages, the ultrasonic waves produced by the piezoelectric elements combine to produce a net ultrasonic wave that travels along a preferred beam direction and is focused at a selected point along the beam. By controlling the time delay and amplitude of the applied voltages, the beam with its focal point can be moved in a plane to scan the subject.

The same principles apply when the transducer is employed to receive the reflected sound (receiver mode). That is, the voltages produced at the transducer elements in the array are summed together such that the net signal is indicative of the sound reflected from a single focal point in the subject. As with the transmission mode, this focused reception of the ultrasonic energy is achieved by imparting separate time delay (and-/or phase shifts) and gains to the signal from each transducer array element.

This form of ultrasonic imaging is referred to as "phased array sector scanning", or "PASS". Such a scan is comprised of a series of measurements in which the steered ultrasonic wave is transmitted, the system switches to receive mode after a short time interval, and the reflected ultrasonic wave is received and stored. Typically, transmission and reception are steered in the same direction ($\theta$) during each measurement to acquire data from a series of points along an acoustic beam or scan line. The receiver is dynamically focused at a succession of ranges (R) along the scan line as the reflected ultrasonic waves are received. The time required to conduct the entire scan is a function of the time required to make each measurement and the number of measurements required to cover the entire region of interest at the desired resolution and signal-to-noise ratio. For example, a total of 128 scan lines may be acquired over a 90 degree sector, with each scan line being steered in increments of 0.70°. A number of such ultrasonic imaging systems are disclosed in U.S. Pat. Nos. 4,155,258; 4,155,260; 4,154,113; 4,155,259; 4,180,790; 4,470,303; 4,662,223; 4,669,314 and 4,809,184, all of which are assigned to the instant assignee.

The measurement of blood flow in the heart and vessels using the Doppler effect is well known. Whereas the magnitude of the reflected waves is employed to produce gray images of the tissues, the frequency shift of the reflected waves may be used to measure the velocity of reflecting tissues. Color flow images are produced by superimposing a color image of the flowing tissues over the black and white magnitude image. The measured velocity of flow at each pixel determines its color.

A major difficulty in making Doppler measurements of reflected ultrasonic waves is that the echo signal typically contains a large component produced by stationary or slowly moving tissues. Stationary tissues do not produce any frequency shift in the reflected waves and these components can be easily filtered out without affecting the flow measurement. However, reflections produced by the moving walls of the heart and vessels are frequency shifted and are difficult to differentiate from slowly flowing blood. Prior systems provide a "wall filter" which is manually adjusted by the operator to filter out a narrow band of frequencies in the echo signal centered on the carrier frequency. It is up to the operator to adjust the width of this filter in such a manner that the reflected wall signals are eliminated without distorting the measurement of blood flow. While such a static filter may work satisfactorily at some locations in the field-of-view of the imager it may not be the proper setting for other locations.

SUMMARY OF THE INVENTION

The present invention relates to a color flow processor for an ultrasonic imaging system, and particularly, to an adaptive wall filter which automatically adjusts its center frequency and bandwidth as a function of the received echo signal. More specifically, the color flow processor includes a first autocorrelation estimator which receives the demodulated, baseband echo signal and produces output signals which indicate the mean frequency thereof and the variance from the mean frequency. A Fourier transformation circuit receives the baseband echo signal and transforms it to a frequency domain echo signal. Excision control means are employed for receiving the mean frequency signal and the variance signal and producing excision signals which indicate a band of frequencies to be filtered. Filter means are provided for receiving the frequency domain echo signal and the excision signals and removing from the frequency domain echo signal those frequencies indicated by the excision signals. Centroid means are coupled to receive the filtered echo signal and produce an output signal which indicates the mean frequency thereof. Means responsive to the output signal of the centroid means are utilized to produce a color signal indicative of flow velocity.

A general object of the invention is to improve accuracy of color flow measurements based on ultrasonic Doppler signals. The measured mean frequency and variance of the unfiltered baseband echo signal provide an accurate indication of the center frequency and bandwidth of the Doppler shifted echo signal components produced by stationary and slowly moving tissues such as vessel walls. These measured signals are used to dynamically control the frequencies excised from the frequency domain representation of the returning frequency shifted baseband echo signals, and since the remaining frequency components in this filtered echo signal are primarily due to flowing blood, a more accurate measurement of their mean, Doppler-shifted frequency can be made.

Another object of the invention is to provide a wall filter which dynamically changes to meet a wide variety of operating conditions. Since the wall component of the echo signal typically dominates the measurement of mean frequency and variance, these measurements can be made in real time and used to dynamically control the wall filter characteristics, regardless of their frequency or bandwidth.

Still another object of the invention is to provide a dynamic wall filter for a focused and demodulated echo signal. By implementing the invention in the mid processor section of the receiver after the echo signal has been demodulated and dynamically focused into a single receive beam, it is not necessary to repeat the wall filter in each channel of a multi-channel PASS system.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 5A-5E are graphical illustrations of the signal at various points in the receiver channel of FIG. 5;

FIGS. 7A-7C are graphic illustration to help explain the operation of the color flow processor of FIG. 6.

DESCRIPTION OF THE PREFERRED EMBODIMENT

Figure 1:
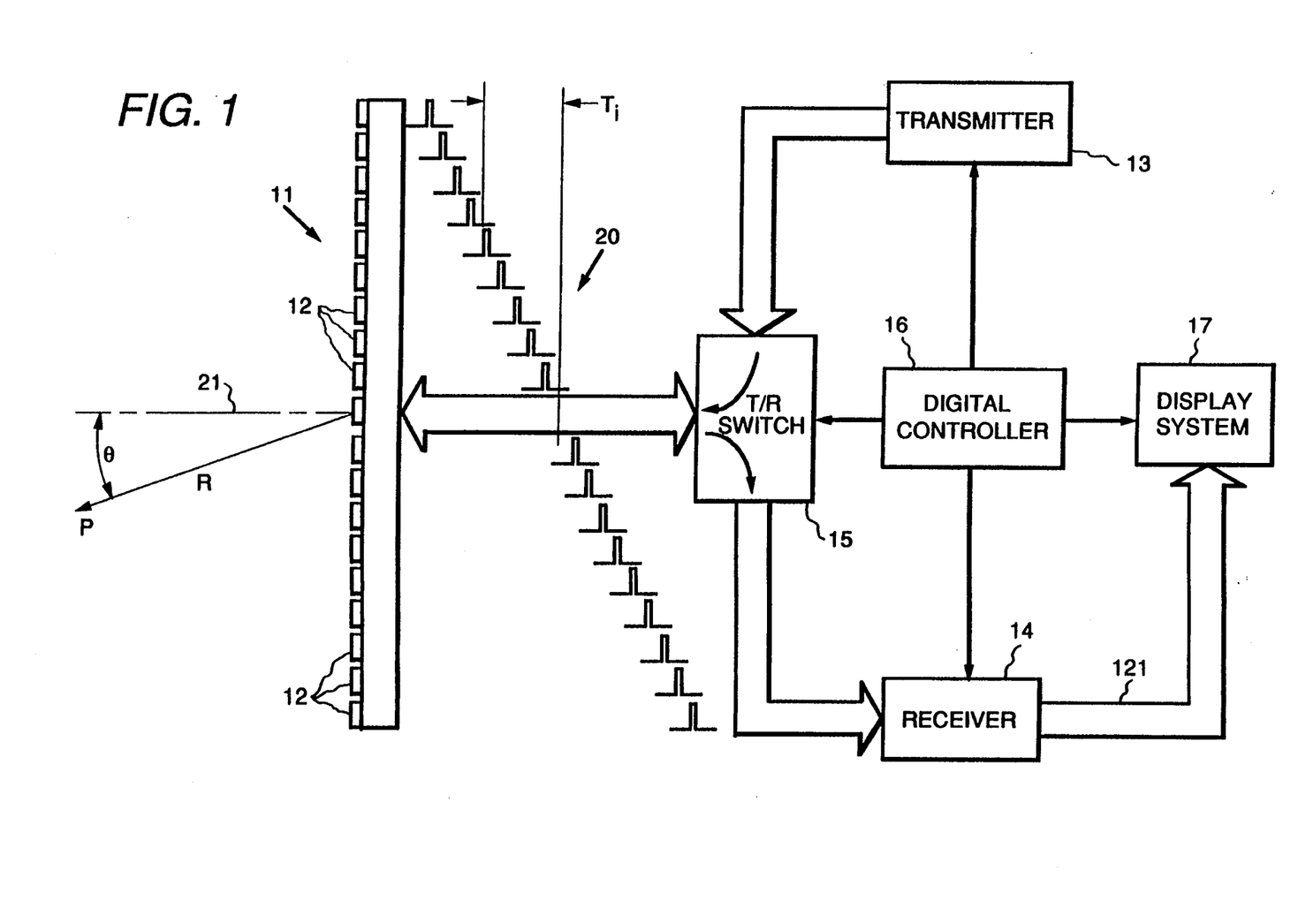
FIG. 1 is a block diagram of an ultrasonic imaging system which employs the present invention.

Referring particularly to FIG. 1, a vibratory imaging system includes a transducer array 11 comprised of a plurality of separately driven elements 12 which each produce a burst of ultrasonic energy when energized by a pulsed waveform produced by a transmitter 13. The ultrasonic energy reflected back to transducer array 11 from the subject under study is converted to an electrical signal by each transducer element 12 and applied separately to a receiver 14 through a set of transmit/receive (T/R) switches 15. Transmitter 13, receiver 14 and switches 15 are operated under control of a digital controller 16 responsive to commands by the human operator. A complete scan is performed by acquiring a series of echoes in which switches 15 are set to their transmit position, transmitter 13 is gated on momentarily to energize each transducer element 12, switches 15 are then set to their receive position, and the subsequent echo signals produced by each transducer element 12 are applied to receiver 14. The separate echo signals from each transducer element 12 are combined in receiver 14 to produce a single echo signal which is employed to produce a line in an image on a display system 17.

Transmitter 13 drives transducer array 11 such that the vibrational energy produced, e.g., ultrasonic energy, is directed, or steered, in a beam. A B-scan can therefore be performed by moving this beam through a set of angles from point-to-point rather than physically moving transducer array 11. To accomplish this, transmitter 13 imparts a time delay ($T_i$) to the respective pulsed waveforms 20 that are applied to successive transducer elements 12. If the time delay is zero ($T_i=0$), all the transducer elements 12 are energized simultaneously and the resulting ultrasonic beam is directed along an axis 21 normal to the transducer face originating from the center of transducer array 11. As the time delay ($T_i$) is increased as illustrated in FIG. 1, the ultrasonic beam is directed downward from central axis 21 by an angle $\theta$. The relationship between the time delay $T_i$ to each $i^{th}$ signal from one end of the transducer array ($i=1$) to the other end ($i=n$) is given by the following relationship:

$$T_i = R_T/c - \sqrt{(R_T/c)^2 + (x/c)^2 - 2xR_T\sin\theta/c^2} \quad (1)$$

where:
- $x$ = distance of center of transducer element 12 from center of transducer array,
- $\theta$ = transmit beam angle,
- $c$ = velocity of sound in the object under study, and
- $R_T$ = range at which transmit beam is focused.

The time delays $T_i$ in equation (1) have the effect of steering the beam in the desired angle $\theta$, and causing it to be focused at a fixed range $R_T$. A sector scan is performed by progressively changing the time delays $T_i$ in successive excitations. The angle $\theta$ is thus changed in increments to steer the transmitted beam in a succession of directions. When the direction of the beam is above central axis 21, the timing of pulses 20 is reversed, but the formula of equation (1) still applies.

Referring still to FIG. 1, the echo signals produced by each burst of ultrasonic energy emanate from reflecting objects located at successive positions (R) along the ultrasonic beam. These are sensed separately by each segment 12 of transducer array 11 and a sample of the magnitude of the echo signal at a particular point in time represents the amount of reflection occurring at a specific range (R). Due to differences in the propagation paths between a reflecting point P and each transducer element 12, however, these echo signals will not occur simultaneously and their amplitudes will not be equal. The function of receiver 14 is to amplify and demodulate these separate echo signals, impart the proper time delay and phase shift to each and sum them together to provide a single echo signal which accurately indicates the total ultrasonic energy reflected from point P located at range R along the ultrasonic beam oriented at the angle $\theta$.

To simultaneously sum the electrical signals produced by the echoes from each transducer element 12, time delays and phase shifts are introduced into each separate transducer element channel of receiver 14. The beam time delays for reception are the same delays (T) as the transmission delays described above. However, in order to dynamically focus, the time delay and phase shift of each receiver channel is continuously changing during reception of the echo to provide dynamic focusing of the received beam at the range R from which the echo signal emanates. The exact equation for the time delay imposed on the signal received by each transducer element is as follows:

$$T_d = t/2 - \sqrt{(t/2)^2 + (x/c)^2 - (xt/c)\sin(\theta)} \quad (2)$$

where:
- $t$ = elapsed time after transmission of sound from the center of the transducer array (i.e. START),
- $c$ = velocity of sound in the object under study, beam angle, and
- $x$ = distance of center of element from center of transducer array.

The same calculation, suitably scaled, also provides the correct phase shift.

Under the direction of digital controller 16, receiver 14 provides delays during the scan such that steering of receiver 14 tracks with the direction of the beam steered by transmitter 13 and it samples the echo signals at a succession of ranges R and provides the proper delays and phase shifts to dynamically focus at points P along the beam. Thus, each emission of an ultrasonic pulse waveform results in the acquisition of a series of data points which represent the amount of reflected sound from a corresponding series of points P located along the ultrasonic beam.

Display system 17 receives the series of data points produced by receiver 14 and converts the data to a form producing the desired image. For example, if an A-scan is desired, the magnitude of the series of data points is merely graphed as a function of time. If a B-scan is desired, each data point in the series is used to control brightness of a pixel in the image, and a scan comprised of a series of measurements at successive steering angles ($\theta$) is performed to provide the data necessary for display.

Figure 2:
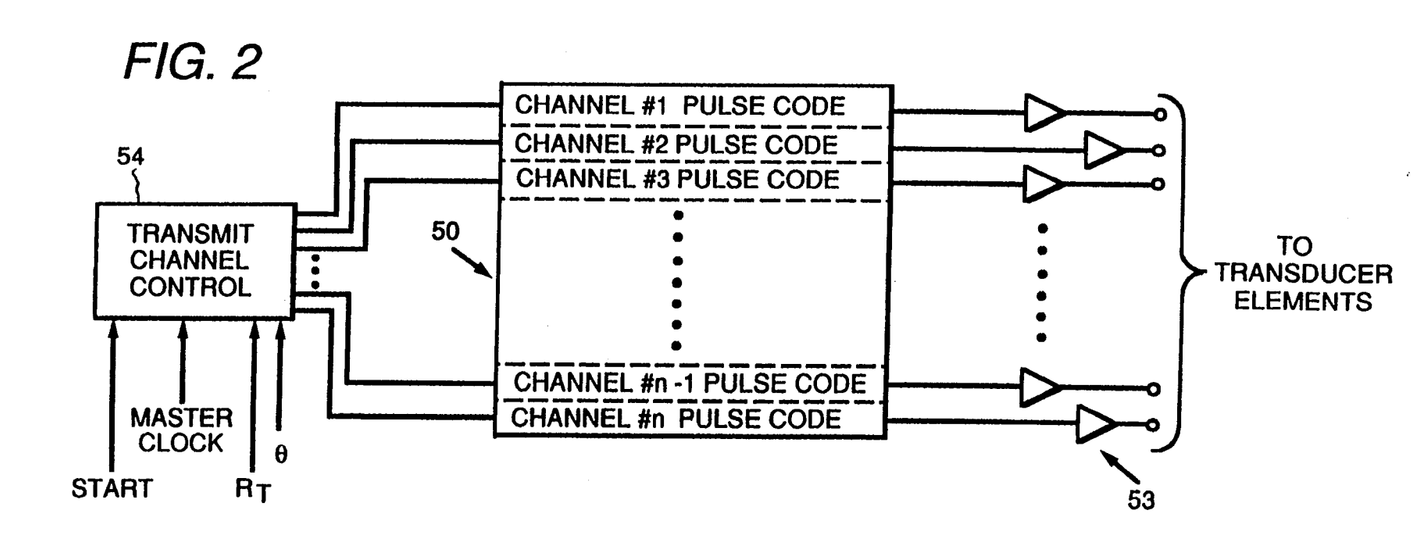
FIG. 2 is a block diagram of a transmitter which forms part of the system of FIG. 1.
Figure 2A:
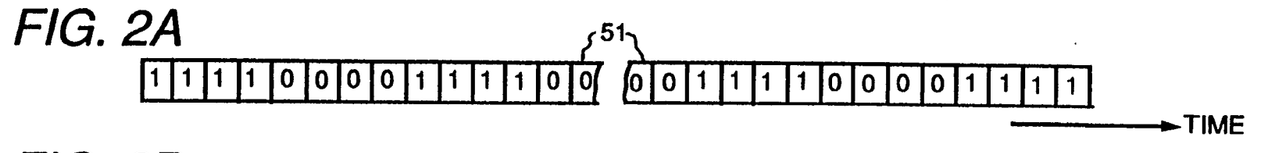
FIG. 2A and 2B are graphical representations of the signal in any of the channels of transmitter 50 of FIG. 2.

Referring to FIG. 2 in conjunction with FIG. 1, transmitter 13 includes a set of channel pulse code memories indicated collectively as memories 50. In the preferred embodiment there are 128 separate transducer elements 12, and therefore, there are 128 separate channel pulse code memories 50. Each pulse code memory 50 is typically a 1-bit by 512-bit memory which stores a bit pattern 51 that determines the frequency of the ultrasonic pulse 52 to be produced. In the preferred embodiment, this bit pattern is read out of each pulse code memory 50 by a 40 MHz master clock and applied to a driver 53 which amplifies the signal to a power level suitable for driving transducer 11. In the example shown in FIG. 2A, the bit pattern is a sequence of four "1" bits alternated with four "0" bits to produce a 5 MHz ultrasonic pulse 52, however, other carrier frequencies ($F_0$) may be employed in the preferred embodiment, such as 2.5, 3.75, 6.25, 7.5, 8.75 and 10 MHz. Transducer elements 12 to which these ultrasonic pulses 52 are applied respond by producing ultrasonic energy. If all 512 bits are used, a pulse of bandwidth as narrow as 40 kHz centered on the carrier frequency (i.e. 5 MHz in the example) will be emitted.

Figure 2B:
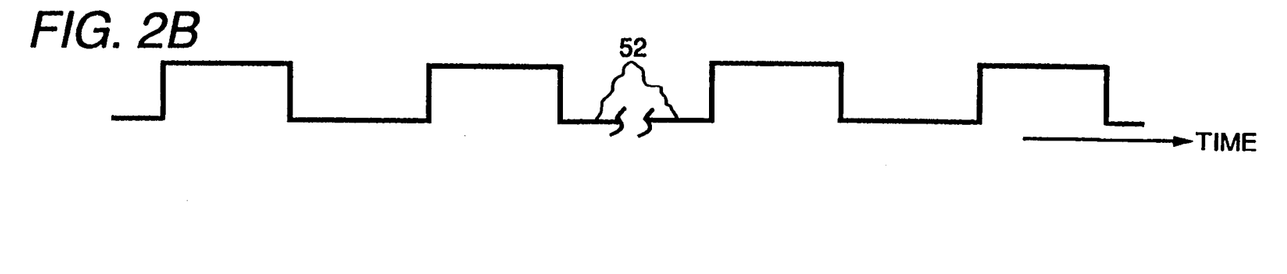

As indicated above, to steer the transmitted beam of the ultrasonic energy in the desired direction ($\theta$), pulses 52 for each of the n channels, such as shown in FIG. 2B, must be delayed by the proper amount. These delays are provided by a transmit control 54 which receives four control signals (START, MASTER CLOCK, $R_T$ and $\theta$) from digital controller 16 (FIG. 1). Using the input control signal $\theta$, the fixed transmit focus RT, and the above equation (1), transmit control 54 calculates the delay increment $T_i$ required between successive transmit channels. When the START control signal is received, transmit control 54 gates one of four possible phases of the 40 MHz MASTER CLOCK signal through to the first transmit channel 50. At each successive delay time interval ($T_j$) thereafter, the 40 MHz MASTER CLOCK signal is gated through to the next channel pulse code memory 50 until all n=128 channels are producing their ultrasonic pulses 52. Each transmit channel 50 is reset after its entire bit pattern 51 has been transmitted and transmitter 13 then waits for the next $\theta$ and next START control signals from digital controller 16. As indicated above, in the preferred embodiment of the invention a complete B-scan is comprised of 128 ultrasonic pulses steered in $\Delta\theta$ increments of 0.70° through a 90° sector centered about central axis 21 (FIG. I) of the transducer 11.

For a detailed description of the transmitter 13, reference is made to commonly assigned U.S. Pat. No. 5,014,712 issued May 14, 1991 and entitled "Coded Excitation For Transmission Dynamic Focusing of Vibratory Energy Beam" incorporated herein by reference.

Figure 3:
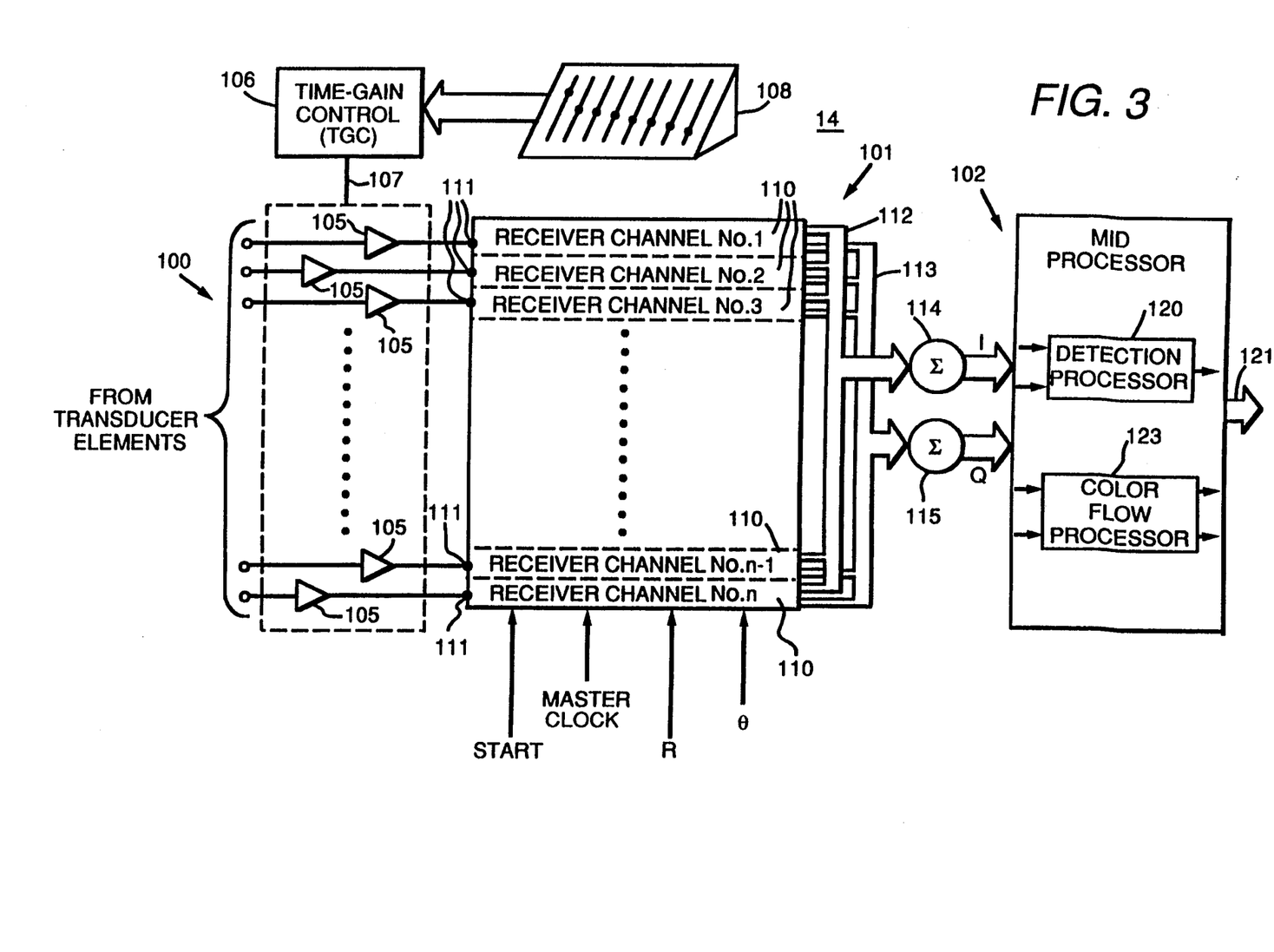
FIG. 3 is a block diagram of a receiver which forms part of the system of FIG. 1.

Referring particularly to FIG. 3, receiver 14 is comprised of three sections: a time-gain control section 100, a receive beam forming section 101, and a mid processor 102. Time-gain control (TGC) section 100 includes an amplifier 105 for each of he n=128 receiver channels and a time-gain control circuit 106 The input of each amplifier 105 is connected to a respective one of transducer elements 12 to receive and amplify the echo signal which it receives. The amount of amplification provided by amplifiers 105 is controlled through a control line 107 that is driven by time-gain control circuit 106. As is well known in the art, as the range of the echo signal increases, its amplitude is diminished. As a result, unless the echo signal emanating from more distant reflectors is amplified more than the echo signal from nearby reflectors, the brightness of the image diminishes rapidly as a function of range (R). This amplification is controlled by the operator who manually sets eight (typically) TGC linear potentiometers 108 to values which provide a relatively uniform brightness over the entire range of the sector scan. The time interval over which the echo signal is acquired determines the range from which it emanates, and this time interval is divided into eight segments by TGC circuit 106. The settings of the eight potentiometers are employed to set the gains of amplifiers 105 during each of the eight respective time intervals so that the echo signal is amplified in ever increasing amounts over the echo signal acquisition time interval.

The receive beam forming section 101 of receiver 14 includes n=128 separate receiver channels 110. As will be explained in more detail below, each receiver channel 110 receives the analog echo signal from one of TGC amplifiers 105 at an input 111, and it produces a stream of digitized output values on an I bus 112 and a Q bus 113. Each of these I and Q values represents a demodulated sample of the echo signal envelope at a specific range (R). These samples have been delayed and phase shifted such that when they are summed at summing points 114 and 115 with the I and Q samples from each of the other receiver channels 110, they indicate the magnitude and phase of the echo signal reflected from a point P located at range R on the steered beam ($\theta$) In the preferred embodiment, each echo signal is sampled at 150 micrometer increments over the entire range of the scan line (typically 40 to 200 millimeters).

For a more detailed description of receiver 14, reference is made to commonly assigned U.S. Pat. No. 4,983,970 issued Jan. 8, 1991 and entitled "Method And Apparatus for Digital Phase Array Imaging", which is incorporated herein by reference.

Referring still to FIG. 3, mid processor section 102 receives the beam samples from summing points 114 and 115. The I and Q values of each beam sample are 32-bit digital numbers representing the in-phase and quadrature components of the magnitude of the reflected sound from a point (R,$\theta$). Mid processor 102 can perform a variety of calculations on these beam samples, where choice is determined by the type of image to be reconstructed. For example, if a conventional magnitude image is to be produced, a detection processor 120 is implemented in which a digital magnitude M is calculated from each receive beam sample and produced at output 121 along with the R,$\theta$ coordinates of the reflection point, according to $$M = \sqrt{I^2 + Q^2} \qquad (3)$$

Detection processor 120 may also implement correction methods such as that disclosed in commonly assigned U.S. Pat. No. 4,835,689, issued May 30, 1989 and entitled "Adaptive Coherent Energy Beam Formation Using Phase Conjugation." Such correction methods examine the received beam samples and calculate corrective values that can be used in subsequent measurements by transmitter 13 and receiver 14 to improve beam focusing and steering. Such corrections are necessary, for example, to account for the inhomogeneity of the media through which the sound from each transducer element travels during a scan.

The present invention relates particularly to a color flow processor 123 which is also located in mid processor 102. Color flow processor 123, which is described in more detail below with respect to FIG. 6, receives the I and Q values of each demodulated and focused echo signal sample from summing points 114 and 115, and produces a 12-bit flow signal at the mid processor output 121. This flow signal, along with digital magnitude M for the same point, is applied to display system 17 where it controls the red, green and blue display colors. As explained in more detail below, the color indicated by this flow signal is a function of the velocity and direction of flow as measured by color flow processor 123.

Figure 4:
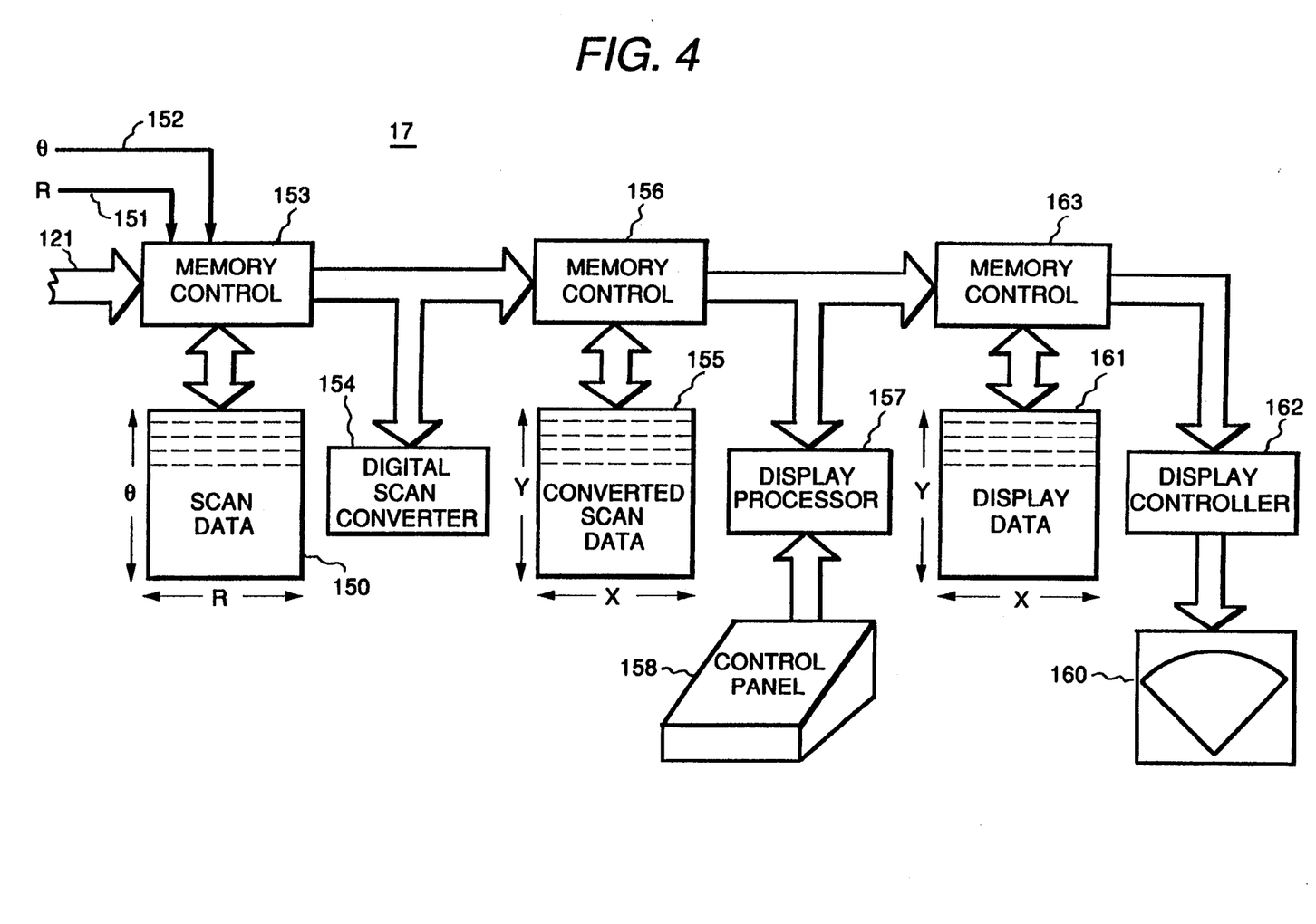
FIG. 4 is a block diagram of a display system which forms part of the system of FIG. 1.

Referring particularly to FIGS. 1 and 4, receiver 14 generates a stream of digital numbers at its output 121, which is applied to the input of display system 17. These "scan data" are stored in a memory 150 as an array, with the rows of scan data array 150 corresponding with the respective beam angles ($\theta$) that are acquired, and the columns of scan data array 150 corresponding with the respective ranges (R) at which samples are acquired along each beam. The R and $\theta$ control signals 151 and 152 from receiver 14 indicate where each input value is to be stored in array 150, and a memory control circuit 153 writes that value to the proper memory location in array 150. The scan can be continuously repeated and the flow of values from receiver 14 will continuously update scan data array 150.

Referring still to FIG. 4, the scan data in array 150 are read by a digital scan converter 154 and converted to a form producing the desired image. If a conventional B-scan image is being produced, for example, the magnitude values M(R,θ) stored in the scan data array 150 are converted to magnitude values M(x,y) which indicate magnitudes at pixel locations (x,y) in the image. Such a polar coordinate to Cartesian coordinate conversion of the ultrasonic image data is described, for example, in an article by Steven C. Leavitt et al in *Hewlett-Packard Journal,* October, 1983, pp. 30–33, entitled "A Scan Conversion Algorithm for Displaying Ultrasound Images."

Regardless of the particular conversion made by digital scan converter 154, the resulting image data are written to a memory 155 which stores a two-dimensional array of converted scan data. A memory control 156 provides dual-port access to memory 155 such that digital scan converter 154 can continuously update the values therein with fresh data while a display processor 157 reads the updated data. Display processor 157 is responsive to operator commands received from a control panel 158 to perform conventional image processing functions on the converted scan data in memory 155. For example, the range of brightness levels indicated by the converted scan data in memory 155 may far exceed the brightness range of display device 160. Indeed, the brightness resolution of the converted scan data in memory 155 may far exceed the brightness resolution of the human eye, and manually operable controls are typically provided which enable the operator to select a window of brightness values over which maximum image contrast is to be achieved. The display processor reads the converted scan data from memory 155, provides the desired image enhancement, and writes the enhanced values to a display memory 161.

Display memory 161 is shared with a display controller circuit 162 through a memory control circuit 163, and the values therein are mapped to control brightness and color of the corresponding pixels in display 160. Display controller 162 is a commercially available integrated circuit which is designed to operate the particular type of display 160 used. For example, display 160 may be a CRT (cathode ray tube), in which case display controller 162 is a CRT controller chip which provides the required sync pulses for the horizontal and vertical sweep circuits and maps the display data to the CRT at the appropriate time during the sweep.

The flow signal, after proper coordinate transformation is stored in memory 155. These data are used by display processor 157 to generate a color output signal suitable for display device 160. Any one of various display devices may be used. For example, an output signal comprised of signals for the colors red, green and blue, each of eight bits, is commonly employed by such devices. Display processor 157, as described more fully below with respect to FIG. 6, therefore provides a mapping between the color flow signals stored in memory 155 and the R, G and B color signals. Display processor 157 also arbitrates the choice between displaying color flow information or displaying gray scale information derived from the echo signal.

It should be apparent to those skilled in the art that display system 17 may take one of many forms depending on the capability and flexibility of the particular ultrasound system. In the preferred embodiment described above, programmed microprocessors are employed to implement the digital scan converter and display processor functions, and the resulting display system is, therefore, very flexible and powerful.

Figure 5:
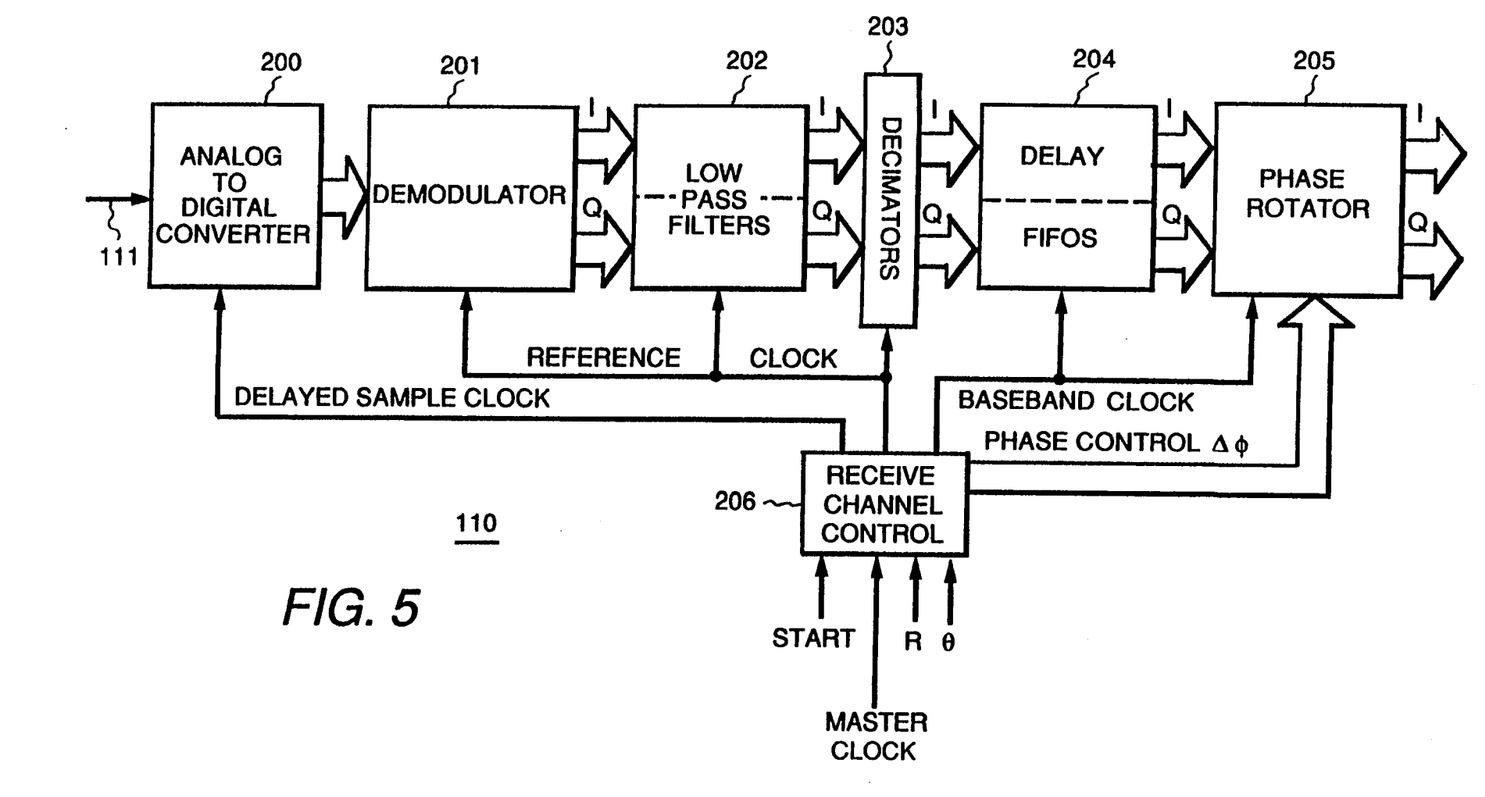
FIG. 5 is a block diagram of a receiver channel which forms part of the receiver of FIG. 3.

As indicated above with reference to FIG. 3, beam forming section 101 of receiver 14 is comprised of a set of receiver channels 110—one for each element 12 of transducer 11 (FIG. 1). Referring particularly to FIG. 5, each receiver channel is responsive to a START command, a 40 MHz master clock, and a beam angle signal (θ) from digital controller 16 (FIG. 1) to perform the digital beam forming functions. These include: sampling the analog input signal 111 in an analog-to-digital converter 200, demodulating the sampled signal in a demodulator 201; filtering out the high frequency sum signals produced by demodulator 201 with low pass filters 202; reducing the data rate in decimators 203; and time delaying and phase adjusting the resulting digital data stream in delay FIFOs (i.e., first-in/first-out memories) 204 and phase rotator 205. All of these elements are controlled by a receive channel control 206 which produces the required clock and control signals in response to commands from digital controller 16. In the preferred embodiment all of these elements are contained on a single integrated circuit.

Figure 5A:
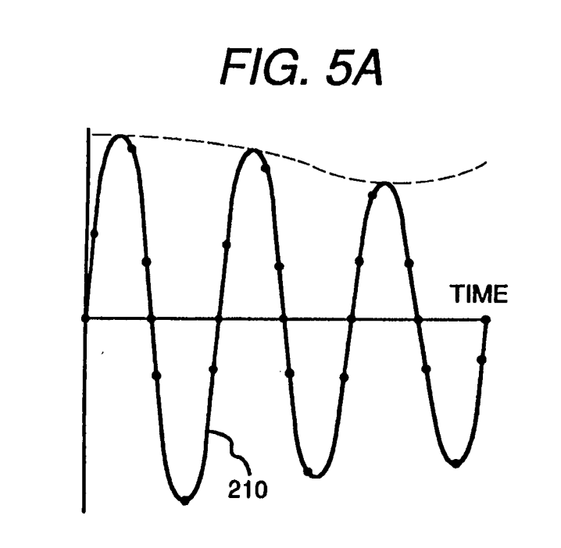
Figure 5B:
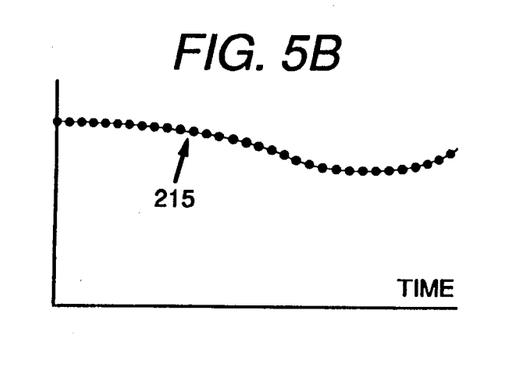

Referring still to FIG. 5, analog-to-digital converter 200 samples the analog signal, indicated graphically by waveform 210 in FIG. 5A, at regular intervals determined by the leading edge of a delayed sample clock signal from receive channel control 206 on line 211. In the preferred embodiment, the sample clock signal is a 40 MHz clock signal to enable use of ultrasonic frequencies up to 20 MHz without violating the Nyquist sampling criteria. When a 5 MHz ultrasonic carrier frequency is employed, for example, it is sampled eight times per carrier cycle and a 10-bit digital sample is produced at the output of the analog-to-digital converter at a 40 MHz rate. These samples are provided to a demodulator 201 which mixes each sample with both a reference that is in-phase with the transmitted ultrasonic carrier, and with a reference in quadrature with the transmitted ultrasonic carrier. The demodulator reference signals are produced from stored SINE and COSINE tables that are read out of their respective ROM (read only =memory) memories by a 40 MHz reference clock signal from receive channel control 206. The SINE value is digitally multiplied by the sampled input signal to produce a demodulated, in-phase value (I) supplied to low pass filter 202, and the COSINE value is digitally multiplied by the same sampled input signal to produce a demodulated, quadrature phase value Q output signal to a separate low pass filter 202. The low pass filters 202 are finite impulse response filters which are tuned to pass the difference frequencies supplied by demodulator 201, but block the higher, sum frequencies. As shown by waveform 215 in FIG. 5B the output signal of each low pass filter is, therefore, a 40 MHz stream of digital values indicating the magnitude of the I or Q component of the baseband echo signal envelope.

For a detailed description of an analog-to-digital converter, a demodulator, and a low pass filter circuit reference is made to commonly assigned U.S. Pat. No. 4,839,652, issued Jun. 13, 1989 and entitled "Method and Apparatus For High Speed Digital Phased Array Coherent Imaging System."

Figure 5C:
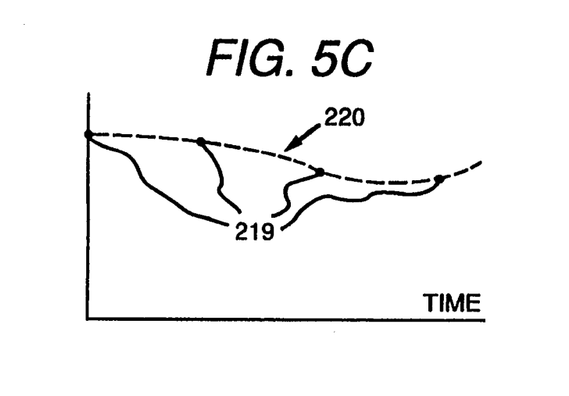

Referring still to FIG. 5, the rate at which the a demodulated I and Q components of the echo signal is sampled is reduced by decimators 203. The 12-bit digital samples are supplied to the decimators at a 40 MHz rate which is unnecessarily high from a bandwidth standpoint, and which is a difficult data rate to maintain throughout the system. Accordingly, decimators 203 select every eighth digital sample to reduce the data rate down to 5 MHz. This corresponds to the frequency of a baseband clock produced by receive channel control 206 and employed to operate the remaining elements in the receiver channel. The I and Q outputs of decimators 203 are thus digitized samples 219 of the echo signal envelope indicated by dashed line 220 in the graph of FIG. 5C. The decimation ratio and the baseband clock frequency can be changed to values other than 8:1 and 5 MHz, for example, a 4:1 ratio and a 10 MHz baseband may be employed.

The echo signal envelope represented by the a demodulated and decimated digital samples is then delayed by delay FIFOs 204 and phase shifted by phase rotator 205 to provide the desired beam steering and beam focusing. Delay FIFOs 204 are memory devices into which the successive digital sample values are written as they are produced by decimators 203 at a rate of 5 MHz. These stored values are written into successive memory addresses and then read from the memory device and supplied to phase rotator 205. The amount of initial delay is determined by the difference between the memory location from which the digital sample is currently being supplied and the memory location into which the currently received digital sample is being stored. The 5 MHz baseband clock establishes 200 nanosecond intervals between stored digital samples and FIFOs 204 can, therefore, provide a time delay measured in 200 nanosecond increments up to their maximum of 25.6 microseconds.

Figure 5D:
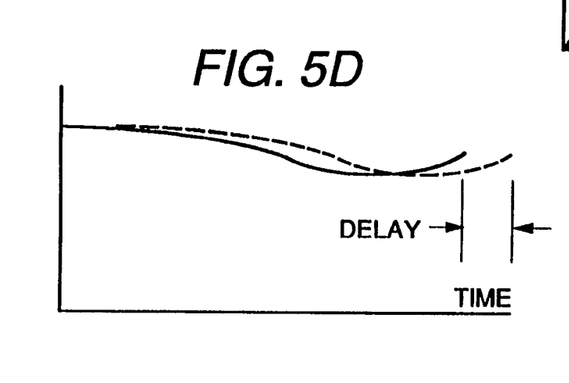

The time delay provided by delay FIFOs 204, illustrated graphically in FIG. 5D, may be changed dynamically during receipt of the echo signal by advancing the data points sampled by decimators 203. Each advancement of the sampled data causes the data stream being supplied to delay FIFOs 204 to be delayed by an additional 25 nanoseconds (1/40 MHz). A signal from receive channel control 206 controls when each advancement of the sampled data should occur.

Figure 5E:
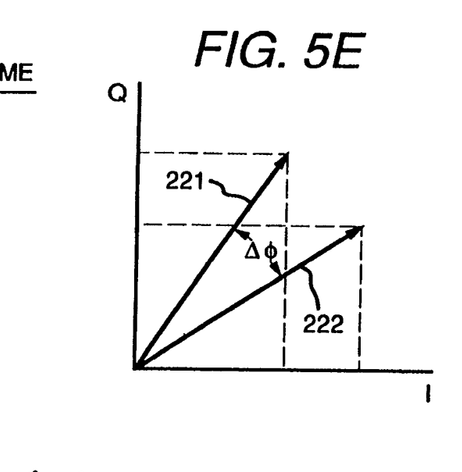

Phase rotator 205 enables the digitized representation of the echo signal to be phase rotated. The I and Q digital samples supplied to phase rotator 205 may be represented, as shown by FIG. 5E, by a phasor 221 and the rotated I and Q digital samples supplied by phase rotator 205 may be represented by phasor 222. The magnitude of the phasors (i.e. the vector sum of their I and Q components) are not changed, but the I and Q values are changed with respect to one another such that the output phasor 222 is rotated by an amount $\Delta\phi$ from the input phasor 221. The phase can be either advanced ($+\Delta\phi$) or delayed ($-\Delta\phi$) in response to a phase control signal received on a bus 223 from the receive channel control 206. For a detailed description of phase rotator 205, reference is made to commonly assigned U.S. Pat. No. 4,896,287, issued Jan. 23, 1990 and entitled "Cordic Complex Multiplier", which is incorporated herein by reference.

For a general description of receiver channel 110 and a detailed description of how the I and Q output signals of each receiver channel 110 are summed together to form a beam signal, reference is also made to the aforementioned U.S. Pat. No. 4,983,970, issued Jan. 8, 1991. For a detailed description of receive channel control 206, reference is made to commonly assigned U.S. patent application Ser. No. 867,597, filed Apr. 13, 1992 entitled "Ultrasound Imaging System With Improved Dynamic Focusing" now U.S. Pat. No. 5,230,240, which is also incorporated herein by reference.

Figure 6:
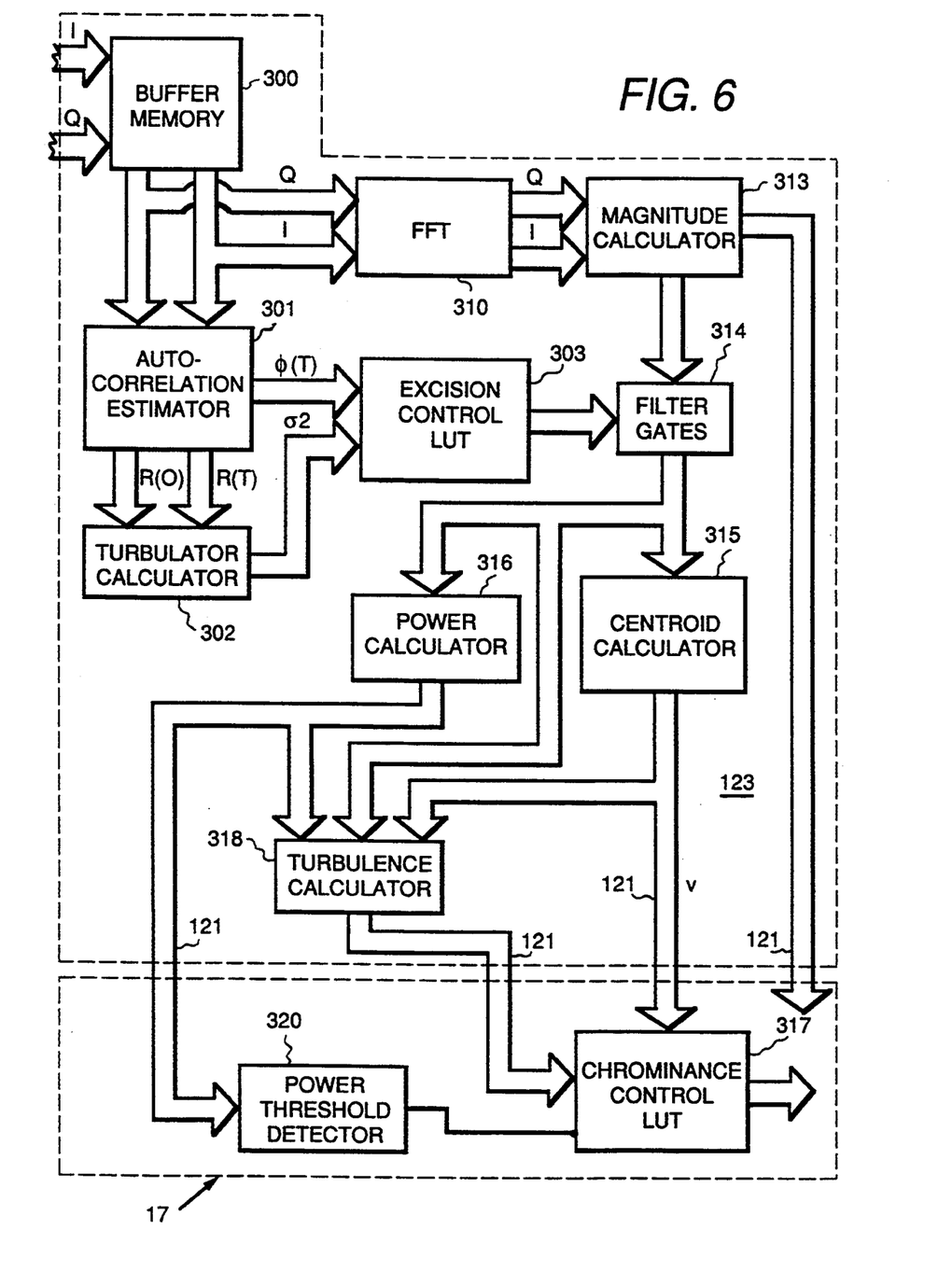
FIG. 6 is a schematic diagram of a color flow processor according to the present invention, which forms part of the receiver of FIG. 3.

Referring particularly to FIG. 6, color flow processor 123 of FIG. 3 may be constructed of commercially available integrated circuits. Processor 123 includes a buffer memory 300 which stores and sorts the I and Q samples of the demodulated echo signal produced by the beam forming section of the receiver during repeated firings of transducer array 11 and applies them to the I and Q inputs of an autocorrelation estimator circuit 301. Memory 300 is known in the art as a "corner turning memory." Autocorrelation estimator 301 may be constructed, for example, from a complex conjugate multiplier, a pair of delays and a pair of integrators as described by C. Kasai et al. in an article in IEEE Transactions on Sonic and Ultrasonics, VOL. SU-32, No. 3, May 1985, entitled "Real-Time Two-Dimensional Blood Flow Imaging Using Autocorrelation Technique", which is incorporated herein by reference. This circuit produces an output signal $\phi(T)$ which represents the mean value of the frequency of the n samples applied to its inputs. If there is no movement of the reflectors, there is no Doppler change in frequency of the echo samples and this output signal is zero. If there is motion in one direction, output signal $\phi(T)$ has a positive value, and if motion is in the opposite direction, output signal $\phi(T)$ has a negative value.

Autocorrelation estimator 301 has two additional outputs R(O) and R(T) from which the variance of the unfiltered baseband echo signal can be calculated. This calculation is performed by a turbulence calculation circuit 302 in accordance with the following equation:

$$\sigma^2 = (1 - |R(T)|/R(O))/T^2 \tag{4}$$

where T is the emission interval of ultrasonic pulses. This variance ($\sigma^2$) is an indication of the frequency width of the wall signal components and is supplied to the address terminals of an excision control LUT (look-up table) 303 along with the mean velocity measurement $\phi(T)$ from autocorrelation estimator 301.

Figure 7A:
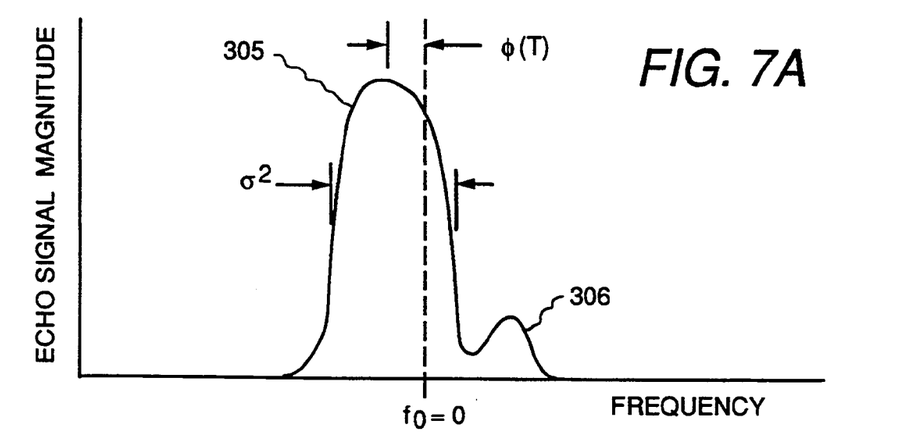

Referring particularly to FIG. 7A, the frequency spectrum of a representative baseband echo signal is shown in which a relatively large wall signal component 305 is frequency shifted in one direction from the carrier frequency $f_0$ (which is zero after demodulation to baseband) and a much smaller flow component 306 is frequency shifted in the other direction. The mean frequency measurement $\phi(T)$ of the total signal is essentially an indication of the center frequency of the undesired wall component 305, and the variance measurement $\sigma^2$ is essentially an indication of its width.

Figure 7B:
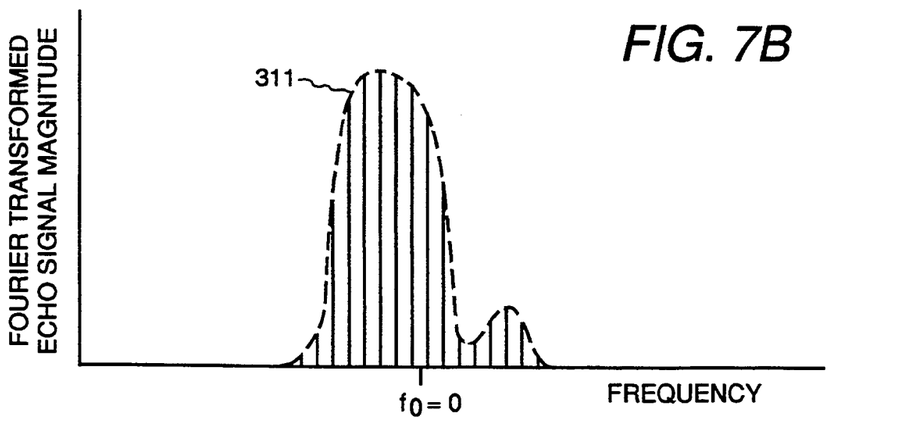

Referring again to FIG. 6, the adaptive wall filter of the present invention requires that the a demodulated, baseband echo signal (i.e. at carrier if frequency $f_0=0$) be transformed from the time domain to the frequency domain. This is accomplished by a fast Fourier transformation (FFT) circuit 310 which receives the I and Q components of the a demodulated echo signal samples from buffer memory 300. When 16 to 64 samples have been received, FFT circuit 310 performs a complex Fourier transformation thereof and produces a set of 16 to 64 I and Q values which represent the frequency components of the baseband echo signal. This is illustrated graphically in FIG. 7B for the exemplary baseband echo signal of FIG. 7A, where each vertical line under curve 311 represents the magnitude of a particular frequency component produced by FFT circuit 310. Dashed curve 31 represents the envelope of these magnitudes and corresponds to the baseband echo signal 305 shown in FIG. 7A.

Figure 7C:
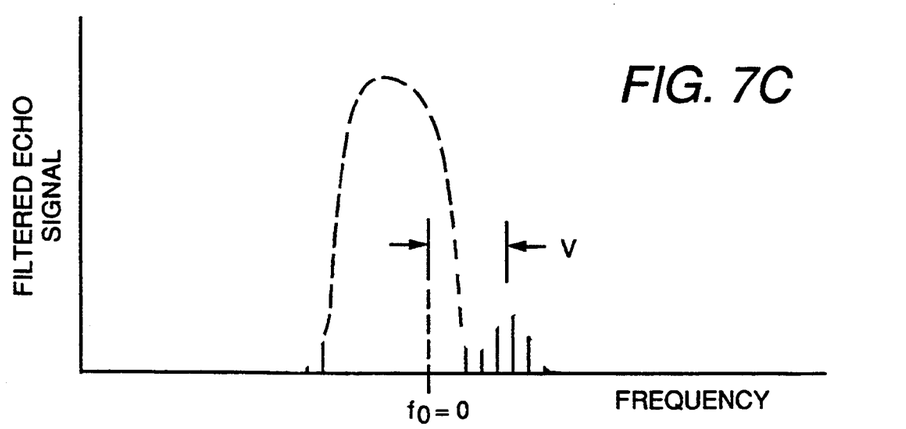

Referring again to FIG. 6, each frequency component output signal, or "bin", of FFT circuit 310 is applied to a magnitude calculator 313 which determines the square root of the sum of the squares of the real and imaginary components of the I and Q values. These 16 to 64 (depending on the number of repeated firings) frequency component magnitudes are sequentially clocked through a set of filter gates 314 and into a centroid calculator 315 and a power calculator 316. Filter gates 314 are controlled by the output signal of excision control LUT 303 such that those frequency components at the measured mean frequency $\phi(T)$ and the surrounding band of components determined by the measured variance $\sigma^2$ are blocked or filtered. This is illustrated graphically in FIG. 7C where the frequency components that comprise the bulk of the wall signal 305 have been eliminated by the operation of filter gates 314. Those components which remain provide an accurate indication of the echo signal components which have been Doppler shifted due to flow.

The frequency components removed by filter gates 314 will change as a function of the mean frequency and variance of the wall signal component. As a result, the wall filter according to the present invention adapts automatically to different operating conditions. For example, if the wall signal components should occupy a narrower band of frequencies, a smaller variance measurement ($\sigma^2$) will result, in turn resulting in a smaller band of frequencies being excised from the baseband echo signal.

Centroid calculator 315 determines the mean frequency of the filtered, transformed baseband echo signal. This calculation may be performed by calculating the first moment of the power spectrum in accordance with the following equation:

$$f_{mean} = \Sigma f_i Power_i / \Sigma Power_i \qquad (5)$$

where:
i corresponds to each bin of the FFT signal;
$f_i$ is the frequency of each bin i; and
$Power_i$ is the square of the signal in each bin i.

The mean frequency produced by centroid calculator 315 is proportional to the mean velocity v of flowing reflectors and it forms part of the output signal of color flow processor 123. The output signals of centroid calculator 315, turbulence calculator 318 and magnitude calculator 313 comprise the color flow signal produced at output 121 of color flow processor 123. These signals comprise the input signals supplied to display system 17. Within digital scan converter 154 (FIG. 4) of display system 17, these signals undergo coordinate transformation to convert the data from polar coordinates to Cartesian coordinates as described above.

After coordinate transformation, the output signal (v) from centroid calculator 315 is applied to the least significant digit address inputs on a chrominance control look-up table memory 317 which forms part of display system 17. Each addressable line in this memory stores twenty four bits of red, green and blue color data that are read out to display controller 162 (FIG. 4) for each pixel, as described above. Eight of these bits control the intensity of red, eight others control the intensity of green, and the remaining eight bits control the intensity of blue. These bit patterns are preselected such that as the flow velocity, as represented by signal v, changes in direction or magnitude, the color of the pixel at the location R,$\theta$ is changed. For example, flow toward the transducer may be indicated as red and flow away from the transducer may be indicated as blue. The faster the flow, the brighter the color.

To indicate the nature of the flowing reflectors, a turbulence calculator 318 is coupled to the outputs of power calculator 316, filter 314 and centroid calculator 315, and produces an output signal which indicates the frequency spread of the flow signal component of the baseband echo signal. This value is indicative of flow turbulence, since laminar flow has a very narrow range of velocities while turbulent flow is a mixture of many velocities. The turbulence value is supplied at color flow processor output 121, and is provided to the most significant digit address terminals on chrominance control LUT 317 to complete the address to a selected line therein. For example, for each red and blue value which is addressable by the velocity input signal (v) to chrominance control LUT 317, there is a set of sixteen entries in LUT 317 with different amounts of green. The amount of green is selected by the turbulence measurement. As a result, the mean flow velocity at a point in the image is indicated by the amount of red or blue and the degree of turbulence is indicated by the amount of green.

When the flow signal component in the baseband echo signal drops below a predetermined level, it is not possible to accurately discern flow from the background noise. When this occurs, the color signal from chrominance control LUT 317 is disabled so that no color is produced and the pixel appears at a level or degree of gray determined solely by the magnitude of the echo signal. This is accomplished by a power threshold detector 320 which is coupled to the output of power calculator 316 and provides a logic signal to chrominance control LUT 317. If the flow signal power exceeds a preset level, chrominance control LUT 317 is enabled by power threshold detector 320, and if it drops below that preset level, LUT 317 is disabled and display controller 162 (FIG. 4) is controlled solely by the echo signal magnitude.

Power calculator 316 and turbulence calculator 318 are comprised of discrete digital signal processing components which perform the following calculations on the stream of data produced by filter gates 314 and centroid calculator 315. For power calculator 316, total output power may be represented as $$\Sigma Power_i.$$

For turbulence calculator 318:

$$\text{Turbulence} = \sigma^2 = \Sigma (f_i - f_{mean})^2 Power_i / \Sigma Power_i \qquad (6)$$
$$= \Sigma f_i^2 Power_i / \Sigma Power_i - f_{mean}^2$$

where
$f_i$ = frequency of the output bin of filter gates 314; and
$f_{mean}$ = output signal of centroid calculator 315.

While the invention has been described in connection with an ultrasonic imager employing a baseband beamforming receiver, which generates a baseband signal within each channel, other forms of vibration energy receivers may be employed. For example, a radio frequency (r.f.) system may be used where the beam, in a given direction, is formed by the summation of channel signals, each delayed by an appropriate amount. The r.f. beam formed in this manner is then converted to baseband within mid processor section 102. Alternatively, as a second example, the received channel data may be demodulated to an intermediate frequency for beamforming in receiver section 101. In this instance the beam is also converted to baseband in mid processor section 102 (FIG. 3). In both cases, the beam data are converted to baseband prior to their storage in memory 300 (FIG. 6).

Still other forms of a color flow imaging system which may be employed in conjunction with the present invention will be apparent to those skilled in the art. While the invention has been described in terms of an electronically scanned array, the beam direction may be set by mechanically positioning a focused ultrasonic transducer probe. In this instance, no additional beamforming is necessary to form the beam. Demodulation takes place in mid processor 102 (FIG. 3) where baseband signals are formed prior to their storage in memory 300 (FIG. 6). Beam directional signals 151 and 152 are derived from the mechanical position indicators of the probe.

Further, although the invention has been described in terms of digital processing of the signals, analog processing or combinations of analog processing and digital processing are also feasible.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

We claim:

1. In a vibratory energy imaging system which includes a receiver that demodulates an echo signal received from a vibratory energy transducer to produce a baseband echo signal, a color flow processor for producing a display in color, said color flow processor comprising:
   an autocorrelation estimator coupled to receive the baseband echo signal and operable to produce an output signal indicative of the mean frequency of said baseband echo signal;
   Fourier transformation means for receiving the baseband echo signal and transforming it to a frequency domain echo signal having real and imaginary components;
   excision control means responsive to said autocorrelation estimator for producing an excision signal which indicates a mean frequency to be filtered from the frequency domain echo signal;
   filter gate means;
   means coupling said Fourier transformation means to said filter gate means, said filter gate means being responsive to the excision control means for removing from the frequency domain echo signal the frequency indicated by the excision signal;
   centroid calculator means coupled to said filter gate means for receiving the filtered frequency domain echo signal and producing an output signal corresponding to the mean frequency of the filtered frequency domain echo signal;
   chrominance control means; and
   means coupling said centroid calculator means to said chrominance control means, said chrominance control means being operable in response to the mean frequency output signal of said centroid calculator means to control color of said display.

2. The apparatus of claim 1 including a turbulence calculator for producing a variance output signal which is indicative of the frequency width of wall signal components in said baseband echo signal, and wherein said excision control means includes means for receiving the variance output signal from said turbulence calculator and in response thereto indicating in said excision signal a band of frequencies about said mean frequency to be filtered from the frequency domain echo signal.

3. The apparatus of claim 2 wherein said means coupling said Fourier transformation means to said filter gate means comprises magnitude calculator means for calculating the square root of the sum of the squares of the real and imaginary components of the frequency domain echo signal produced by said Fourier transformation means.

4. The apparatus of claim 1 and further including a turbulence calculator coupling the output of said filter means and the output of said centroid calculator means to said chrominance control means and being operable to supply to said chrominance control means an output signal corresponding to the frequency spread of the filtered frequency domain echo signal 5. The apparatus of claim 4 and further including:
   power calculating means coupled to the output of said filter gates for providing an output signal corresponding to total output power supplied by said filter gates; and
   power threshold detecting means coupling said power calculating means to said chrominance control means for enabling said chrominance control means when the power level of said filtered frequency domain echo signal exceeds a preset level and disabling said chrominance control means when said power level falls below said preset level.

6. The apparatus of claim 5 including a second turbulence calculator for producing a variance output signal which is indicative of the frequency width of wall signal components in said baseband echo signal, and wherein said excision control means includes means for receiving the variance output signal from said turbulence calculator and in response thereto indicating in said excision signal a band of frequencies about said mean frequency to be filtered from the frequency domain echo signal.

7. The apparatus of claim 4 including a second turbulence calculator for producing a variance output signal which is indicative of the frequency width of wall signal components in said baseband echo signal, and wherein said excision control means includes means for receiving the variance output signal from said turbulence calculator and in response thereto indicating in said excision signal a band of frequencies about said mean frequency to be filtered from the frequency domain echo signal.

8. The apparatus of claim 1 wherein said vibratory energy comprises ultrasonic energby and said vibratory energy transducer comprises an ultrasonic transducer.

9. In a vibratory energy imaging system which includes a receiver that demodulates an echo signal received from a vibrational energy transducer to produce a baseband echo signal, a method of operating a color flow processor that controls a display system, said method comprising the steps of:
   producing an output signal indicative of the mean frequency of said baseband echo signal;

Fourier transforming the baseband echo signal to a frequency domain echo signal;

producing, from said frequency domain signal, an excision signal which indicates a mean frequency to be filtered;

filtering out of the frequency domain echo signal the frequency indicated by the excision signal;

producing an output signal corresponding to the mean frequency of the filtered frequency domain echo signal; and controlling color of a display in accordance with the mean frequency of the filtered frequency domain echo signal.

10. The method of claim 9 including the step of producing a variance output signal indicative of the frequency width of wall signal components in said baseband echo signal, and indicating in said excision signal a band of frequencies about said mean frequency to be filtered from the frequency domain echo signal.

11. The method of claim 9 and including the step of further controlling color of said display in accordance with frequency spread of the filtered frequency domain echo signal.

12. The method of claim 11, further including the step of producing a signal corresponding to total power of said filtered frequency domain echo signal, and wherein the step of controlling color of a display in accordance with the mean frequency of the filtered frequency domain echo signal comprises the steps of enabling production of color in said display when the power level of said filtered frequency domain echo signal exceeds a preset level and disabling production of color in said display when said power level falls below said preset level.

13. The method of claim 9 wherein said vibratory energy comprises ultrasonic energy and said vibratory energy transducer comprises an ultrasonic transducer.

* * * * *